United States Patent [19]

Venor et al.

[11] 3,973,963

[45] Aug. 10, 1976

[54] PHOTOGRAPHIC SUPPORT COMPRISING POLYMERIZED PROPYLENE, TALC, TITANIUM DIOXIDE, ELASTOMER AND ANTIOXIDANT

[75] Inventors: William J. Venor, Henrietta; John C. Hoppe, Spencerport, both of N.Y.; William W. Blount, Jr., Kingsport, Tenn.

[73] Assignee: Eastman Kodak Company, Rochester, N.Y.

[22] Filed: Oct. 1, 1974

[21] Appl. No.: 510,880

Related U.S. Application Data

[60] Division of Ser. No. 309,304, Nov. 24, 1972, Pat. No. 3,874,880, which is a continuation-in-part of Ser. No. 90,053, Nov. 16, 1970, abandoned.

[52] U.S. Cl. .......................................... 96/3; 96/77; 428/523
[51] Int. Cl.² .................... G03C 7/00; G03C 1/40; B23B 27/00; B44D 1/22
[58] Field of Search ................ 96/3, 29 D, 77, 87 R, 96/119 R; 428/523

[56] References Cited
UNITED STATES PATENTS

| | | | |
|---|---|---|---|
| 3,227,550 | 1/1966 | Whitemore et al. | 96/3 |
| 3,529,037 | 9/1970 | Hegemoyer et al. | 96/87 R |
| 3,874,880 | 4/1975 | Venor et al. | 96/87 R |

FOREIGN PATENTS OR APPLICATIONS

| | | | |
|---|---|---|---|
| 1,090,059 | 12/1964 | United Kingdom | 260/17 |

*Primary Examiner*—David Klein
*Assistant Examiner*—Richard L. Schilling
*Attorney, Agent, or Firm*—Henry E. Byers

[57] ABSTRACT

Compositions are provided comprising a film-forming crystalline polypropylene, crystalline block copolymer of propylene and at least one other α-monoolefin selected from the group of ethylene and α-monoolefin hydrocarbons of 4 to 10 carbon atoms or mixtures of the block copolymer and the polypropylene, having incorporated therein about 15 to 40% by weight talc, 5 to 15% by weight titanium dioxide pigment, 5 to 20% of an elastomer and one-tenth to 1% by weight of a polyolefin antioxidant.

The films or sheets prepared from these polyolefin compositions have the stiffness, opacity and printability normally associated with paper and provide excellent replacements for paper used in photographic elements. In addition, they have excellent tear strength and elongation.

2 Claims, No Drawings

PHOTOGRAPHIC SUPPORT COMPRISING POLYMERIZED PROPYLENE, TALC, TITANIUM DIOXIDE, ELASTOMER AND ANTIOXIDANT

CROSS-REFERENCE TO RELATED APPLICATION

This is a division of application Ser. No. 309,304, filed Nov. 24, 1972.

The parent application, now U.S. Pat. No. 3,874,880, issued Apr. 1, 1975, is a continuation-in-part of U.S. patent application Ser. No. 90,053, filed Nov. 16, 1970 in the names of Venor, Hoppe and Blount, now abandoned.

BACKGROUND OF THE INVENTION

This invention relates to a polyolefin composition from which films may be prepared having the stiffness, opacity and printability normally associated with paper. In another aspect, the present invention is directed to polymeric sheets or films of such polyolefin compositions useful in the field of photography as, for instance, in the preparation of photographic elements and to photographic elements employing such sheets.

Although polymeric films which can be printed are known, they have not proved entirely satisfactory as replacements for paper. One drawback of these polymeric films has been their lack of stiffness and opacity. Another deficiency of prior art printable polymeric films is their instability. For example, British Patent No. 1,090,059 describes a printable polymeric sheet of polyethylene-based compositions in which siliceous fillers are incorporated along with a resin such as an ethylene-vinyl acetate copolymer. Other polymeric sheets have been proposed as paper substitutes made from polyvinyl chloride, polyethylene, polystyrene, and polyamide. Although sheets of these polymeric compositions exhibit many of the characteristics normally associated with paper, the sheets have been found to be labile to heat and ultraviolet light and, in addition, are degraded by certain adhesives (e.g., animal glues containing permanent plasticizers) used in book casing and poster-board fabrication or are subject to yellowing.

Some sheets are made by synthetic fibers formed on a paper making machine. Others require special surface treatments such as solvent degradation to obtain a white appearance or adherence to subsequent coatings or to a printed image.

Polymeric sheets have also been proposed as substitutes for paper in the preparation of photographic elements containing the sheets as supports for one or more light-sensitive layers. These polymeric materials, however, have yet to display the outstanding advantages of paper or similar fibrous materials. Among the shortcomings of polymeric photographic supports are difficulties such as dimensional stability, i.e. the occurrence of dishing, fluting and edge penetration, photographic activity of components resulting in fogging, etc. In addition, major losses in sharpness occur due to the separation of the lightsensitive layers from the reflecting layers adjacent the polymeric sheets.

One object of the invention, therefore, is to provide polyolefin compositions capable of being formed into films and sheets which possess characteristics usually associated with paper as, for instance, stiffness, preferably having a Tensile Modulus of elasticity of above about 50,000, opacity and printability; yet retain the desirable properties of polymeric film such as high tear strength, high elongation, water-resistance, heat sealability, extrudability, ability to be laminated, etc.

Another object of the invention is to provide polymeric compositions capable of being formed into sheets having the desirable properties of the paper and polymeric films, yet of improved stability to ultraviolet light and heat of from about 400° to 500°F.

Yet another object of the invention is to provide photographic elements comprised of at least one radiation-sensitive layer on a photographically inert polymeric support which exhibit improved image sharpness and dimensional stability while, at the same time, exhibiting high resistance to water, temperature, wear-and-tear and abrasion.

A further object of the invention is to provide elements of the above type wherein the radiation-sensitive layers are silver halide emulsion layers.

Yet a further object of the invention is to provide photographic elements of the above type wherein the photographic support is coated with silver halide emulsion layers differentially sensitized to blue, green and red.

A still further object of the invention is to provide multilayer elements coated on said polymeric support wherein the silver halide emulsion layers contain color-forming couplers therein.

An additional object of the invention is the use of the polymeric materials as receiving sheets in diffusion transfer photographic processes.

SUMMARY OF THE INVENTION

These and other objects of the invention are obtained with a polymeric composition comprising crystalline polypropylene or a film-forming crystalline polymer selected from the class consisting of a block copolymer of propylene with at least one other α-monoolefin selected from the group of ethylene and α-monoolefin hydrocarbons of 4 to 10 carbon atoms, identified as polyallomers as described in Hagemeyer et al U.S. Pat. No. 3,529,037 issued Sept. 15, 1970, mixtures of a polyallomer with crystalline polypropylene and polypropylene, having incorporated in said composition about 15 to about 40%, preferably 15 to 25% by weight talc, about 5 to about 15%, preferably 6 to 10%, by weight titanium dioxide pigment, about 5 to about 20% by weight of a polyolefin elastomer, and about one-tenth to about 1% by weight of a polyolefin antioxidant. The combination of titanium dioxide and talc plays an important role in achieving the aforementioned objects of the invention. Combinations of other fillers and pigments, for instance, fail to provide the desired results. Moreover, the concentrations in which the talc and titanium dioxide are employed are also important from the standpoint of obtaining the characteristics desired in the finished sheet.

Although about 5 to about 20% by weight of a polyolefin elastomer is included in the polymeric composition to obtain the tear strength and elongation of sheets or films fabricated from the composition, we prefer to use about 7 to about 12% by weight. In those instances where the polymeric composition is to be used for the preparation of a photographic support, it is desirable that the elastomer improve tear strength without adversely affecting photographic activity. The following polyolefin elastomers have been found to be particularly suitable for use in the invention: elastomeric copolymers of ethylene and propylene, commonly known as ethylene/propylene rubber (EPR), including ethylene/propylene terpolymers and polyisoolefin rubber.

Various polyolefin antioxidants can be incorporated in the polymeric composition, preferably antioxidants such as those described in Tholstrup U.S. Pat. No. 3,033,814, issued May 8, 1962, and the phenolic antioxidants in Tholstrup et al. U.S. Pat. No. 3,157,517, issued Nov. 17, 1964, both patents incorporated by reference.

The polymeric composition of the invention is employed to form sheets which are paper-like in appearance. They are typically formed by extrusion and usually of a thickness of about 3 to about 8 mils.

In a photographic embodiment, the polymeric sheets of this invention which are substantially free from photographic activity, are used as supports for one or more light-sensitive coatings including silver halide, diazo, etc.

The crystalline polymer components, elastomers and antioxidants useable in the invention will be discussed below under separate headings.

CRYSTALLINE POLYPROPYLENE

The crystalline polypropylene employed in this invention is a solid, hexane-insoluble, crystalline polymer generally obtained by direct polymerization in the presence of a solid, stereospecific catalyst under polymerization conditions selected to form a polymer having at least 80% crystallinity. Crystalline polypropylenes usually are characterized by an inherent viscosity of at least 1, preferably at least 1.3, often up to about 3.0, as measured in tetralin at 145°C., a density of at least 0.90, preferably 0.905 to 0.920 and a melt flow rate (230°C., 2.16 kg.) of 0.1 to 10, preferably 0.5 to 5.0.

Solid, stereospecific polymerization catalysts are initially mixtures of at least two components, the first component being, for example, a halide of a transition element from the fourth to the sixth subgroups of the Periodic Table and the second component being a metal of Group I-A or II or aluminum, or an alloy of metals of Group I-A and/or II and/or aluminum, or a halide or organometallic compound of a metal of Group I-A or II and/or aluminum, or a complex hydride or a complex organometallic compound of boron or aluminum and a metal of Group I-A or II of the Periodic Table found in "Langes Handbook of Chemistry", 8th Edition (1952), published by Handbook Publishers, Inc. at pages 56 and 57, for example.

The transition metals included in GRoups IV-B – VI-B of the Periodic Table are exemplified by metals such as titanium, zirconium, vanadium, molybdenum, chromium and the like. The transition metal halide catalyst components can be used at their maximum valence, or if desired, a reduced valency form of the halide can be employed. It is preferred to use the titanium chlorides which can be in the form of titanium dichloride, titanium trichloride or titanium tetrachloride. Examples of other transition metal halides that can be employed in the process of this invention include titanium tetrabromide, titanium tribromide, zirconium tetrachloride, zirconium tetrabromide, vanadium trichloride, molybdenum pentachloride, chromium trichloride and the like.

Suitable second components which can be employed in conjunction with the transition element halides to form an effective solid, stereospecific polymerization catalyst include, for example, metal alkyls, metal alkyl halides and metal hydrides of aluminum or Group I-A and II as well as the metals alone. The preferred components is a lithium compound, as exemplified by lithium metal, lithium alkyl, lithium aluminum hydride, lithium aluminum alkyls, lithium borohydride and lithium aluminum compounds having the formula:

$$LiAlH_xR_y$$

wherein $x$ and $y$ are integers from 0 to 4, the sum of $x$ and $y$ is 4 and R is a hydrocarbon radical. Suitable Group I-A or II metals include sodium, potassium, lithium, zinc and the like. The alloys, halides, hydrides or organometallic compounds of these metals which can be employed include, for example, sodium amyl, potassium butyl, lithium propyl, zinc dibutyl, zinc diamyl, zinc dipropyl, ethyl magnesium bromide, sodium hydride, calcium hydride, lithium aluminum hydride and the like. Also, the catalyst composition can contain an organo-aluminum compound such as aluminum triethyl, aluminum tributyl, ethyl aluminum dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. If desired, a third component can be employed in order to increase the stereospecificity of the catalyst. Suitable third components include the halides of alkali metals, magnesium oxide, aromatic ethers, for example, diphenyl ether, hydrides of sodium, potassium and lithium and alcoholates of sodium, potassium, lithium, calcium, magnesium, barium, strontium, aluminum, titanium and zirconium. In addition, it is often desirable to employ tertiary amines and tertiary phosphoramides as third components with alkyl aluminum halides.

Generally, a mole ratio of second component to metal halide of 0.1:1 to 12:1 is satisfactory in the practice of the process. Where a third component is employed, the mole ratios of metal halide to third component of 0.25:1 to about 1:1 are generally satisfactory. The concentration of the catalyst in the reaction medium can be varied over a wide range. For example, catalyst concentrations of 0.1 percent or less, up to 3% or more, can be used.

The polymerization is generally carried out in the liquid phase at a temperature ranging from 0° to 250°C., preferably 50° to 150°C. and a pressure ranging from atmospheric to 20,000 psi., preferably about 30 to 1,000 psi. An inert organic liquid vehicle for the polymerization reaction is preferred and the catalyst concentration employed is generally about 0.1 to 2% by weight of the inert organic liquid vehicle. The molar ratio of aluminum compared to transition metal halide in the catalyst is varied from 1:0.5 to 1:2, while the molar ratio of halide to third component, if present, is about 1:1 to 1:0.1. Illustrative and more detailed descriptions of polymerization processes that produce the crystalline polypropylene of the invention can be found in the aforementioned U.S. Pat. Nos. 2,956,991 and 3,149,097, hereby incorporated by reference.

PROPYLENE POLYALLOMERS

The polyallomers described herein are solid, crystalline, block copolymers synthesized from propylene and an α-monoolefin selected from ethylene and α-monoolefins having 4-10 carbon atoms and comprise two separate and distinct crystalline segments, i.e., a body segment and a tail segment. They are prepared by polymerizing an α-monoolefin such as ethylene onto preformed crystalline segments of a polypropylene chain formed from propylene using a solid, stereospecific polymerization catalyst such as described above. A preferred catalyst is a mixture of equimolar amounts of $LiAlH_4$, $TiCl_3$ and NaF. Another preferred solid, stereospecific polymerization catalyst, for example, is a 2:1:3 molar ratio of ethyl aluminum sesquichloride, hexamethyl phosphoramide and titanium trichloride.

One such method of preparing the polyallomers is a multi-stage polymerization procedure comprising initially polymerizing the propylene and then polymerizing ethylene onto the polymer chain of the first monomer using a solid, stereospecific polymerization catalyst. The polymerization reaction is continued until the resulting polymer contains at least 80%, most often at least 90%, by weight of polymerized propylene. The multi-stage process can be conducted in a single reactor having separate reaction zones preferably separated by a baffle or other separation means. However, the separate polymerization reactions of the multi-stage process can also be conducted in separate reactors arranged in series and, alternatively, the entire process could be carried out in an elongated tubular reactor.

The polyallomers can also be produced batchwise by carrying out the first stage of the polymerization with propylene and adding the ethylene after a portion of the first monomer, for example, 20 to 30%, has been polymerized. However, in the preparation of the propylene polyallomers, it is preferred that the propylene be employed as a monomer in the first stage. The exact amount of monomer feed after the first stage of the reaction is subject to wide variation depending upon such variables as the reaction conditions employed, the percent of monomer converted in the first stage, the desired molecular weight of the resulting polyallomer, etc. In general, the block copolymer will have an inherent viscosity in tetralin at 145°C. of about 0.4 to 2.4 and a density of at least 0.85.

ELASTOMERS

Various elastomers may be used in the polymeric compositions of the invention. The elastomers typically are elastomeric materials which are compatible with polyolefins and have a molecular weight of from about 500 to about 10,000. They can be dissolved in an organic liquid and give a continuous film when the solvent is evaporated. Particularly useful elastomers are elastomeric ethylene-propylene copolymers which may be used in the polymeric compositions such as the normally solid, ethylene/propylene rubbers. By the term "ethylene/propylene rubber", we mean copolymers of ethylene and propylene and terpolymers prepared by copolymerizing ethylene and propylene with minor amounts of a non-conjugated diene such as dicyclopentadiene or 5-ethylene-2-norbornene.

Ethylene propylene rubber copolymers may be prepared by copolymerizing ethylene with propylene by any of several methods such as methods described in U.S. Pat. Nos. 2,710,663 and 2,726,023 and Belgian Patent Nos. 535,082, 538,782, 553,655 and 583,039. These polymers containing from about 20 to 60 mole percent, most preferably about 30 to 40 mole percent, propylene are particularly useful. Elastomeric terpolymers of ethylene, propylene and non-conjugated dienes, particularly those containing 30 to 45% 5-ethylene-2-norbornene, are also suitable for use in the polymeric composition. The various grades of ethylene-propylene rubber ranging in unsaturation from 0 to 5 mole percent and available commercially are satisfactory resins for the blends of this invention. Such ethylene/propylene rubbers available commercially which may be used are, for example, Enjay EPR-404, Enjay EPT-3509, U.S. Rubber Company's Royalene 502 and EPT and E.I. DuPont's Nordel.

Another type of elastomer suitable for use in this invention is the isoolefin rubber polymer such as poly(isobutylene ethylene) copolymer (Vistanex L-80) and poly(isobutylene). the isoolefin rubber polymers may be prepared by the polymerization of an isoolefin such as isobutylene with or without other alphaolefins such as ethylene in the presence of a suitable catalyst, preferably inorganic halides, e.g. boron fluoride, at a temperature below 50°C. employing the general procedure described in U.S. Pat. No. 2,130,507.

Normally the elastomer is included in the polyolefin composition in an amount of about 5 to about 20% by weight of the composition, preferably about 7 to about 15% by weight.

Polyurethanes can be used and are useful in improving the photooxidative resistance. Polyurethanes available commercially include Pelletane E 2103-80D, (CPR/Upjohn), Texin 355D, (Mobay), and Estane 58092 (B. F. Goodrich).

Styrene-butadiene polymers are also useful, particularly styrene-butadiene-styrene and styrene-isoprenestyrene block copolymers.

ANTIOXIDANTS

Antioxidants which are particularly useful for stabilizing polypropylene and propylene polyallomers which are substantially free of photographic activity include the N,N-dialkyl dithiocarbamates, alkyl phenyl salycilates, 2-hydroxy benzophenones or butylated hydroxy toluenes and the like can be employed with good results. Specific antioxidants which can be employed include 4,4'-butylidene-bis(6-tert. butyl-meta-cresol), di-lauryl-3,3'-thiodipropionate, N-butylated-p-amino phenol, 2,6-ditertiarybutyl-p-cresol, 2,6-ditertiarybutyl-4-methyl phenol, N,N-disalicylidene-1,2-diaminopropane, cresylic acid, diacetone alcohol, isopropanol, toluene, mixed xylenes, butylated hydroxyanisole, butylated hydroxy-toluene, propyl gallate, citric acid, propylene glycol, vegetable oil, sodium silico aluminate, mixed glycerides, glyceryl monooleate, diisobutyl adipate or mixtures thereof. A particularly effective synergistic mixture is one comprising dilauryl thiodipropionate with 4,4'-butylidene-bis (6-tert. butyl-meta-cresol), or butyl hydroxy toluene.

Antioxidants which can be used if the composition is not to be used for photographic elements having thereon a radiation-sensitive silver halide emulsion include tri normal phenyl phosphate, penta erythritol ester of tetra(3,4)-ditertiary-butyl-4-hydroxy-phenyl proprionic acid, N,N-diphenyl-p-phenylenediamines, N,N'-disecondary-butyl-p-phenylenediamine, disalicylal propylene diimine, N,N'-di(1-methyl heptl)-p-phenylenediamine, N,N'-di-2-octyl-p-phenylenediamine, N,N'-di-3(5-methyl heptyl)-p-phenylenediamine, N-1, N-3 dioleoyldiethylene triamine.

Normally, the antioxidant is included in the polyolefin composition from about one-tenth to about 1% by weight of the composition. However, it will be appreciated that larger amounts can be used and that other antioxidants can be used in addition to those given above.

The talc powder employed in the present invention can be a talc having a particle size of 1 to 300 microns. Suitable talcs include the natural talcs (i.e., not subjected to chemical treatment) such as the magnesium and calcium silicates as well as the chemically-treated talcs such as the Mistron talcs. The talc may be of any desired shape, although fibrous, scaly, platy or micaceous, tremolitic or acicular particles are preferred. A variety of suitable talcs are commercially available and include Talc 650 (Georgia Talc), Talc 649 (Eastern Magnesia Talc), Desertalc 84 (Desert Minerals), Desertalc Mikro 706 (Desert Minerals), the various grades of Mistron talcs such as Mistron Vapor, Mistron 25, Mistron H60-55, etc.

The titanium dioxide can be of pigment size and typically has an average mean diameter of about 0.3 micron and a range of about 0.1 micron to 0.6 micron. Either rutile or anatase can be used. However, it will be recognized that pigment size of titanium dioxide can be used which is somewhat smaller or larger.

Minor amounts of other additives commonly added to polymeric compositions may also be incorporated into the compositions of the invention. Illustrative of such additives are antioxidants, ultraviolet light inhibitors, other inorganic fillers, pigments having average particles sizes of about 0.1–20 $\mu$, plasticizers, colorants, brighteners, lubricants, anti-static agents, anti-blocking agents and the like.

The polymeric compositions of the invention, moreover, preferably contain minor amounts of linear polyethylene which further enhances desired properties such as tear resistance in the sheet or film materials produced from the compositions. When employed, useful linear polyethylenes generally have a density of at least about 0.903, preferably about 0.95 to 0.97 and a melt index (190°C.) of 0.1 to 20, preferably 0.5 to 10, and are usually added in amounts of about 2 to 15% by weight of the compositions.

The mixing or blending of the components of the composition of the invention may be conducted by using any of the conventional mixing apparatus such as a Banbury mixer, extruder or the like. The mixing operation may be conducted at a temperature no lower than the softening point or melting point of the polypropylene or polyallomer component and, in the case of a mixture of the components, no lower than the highest softening or melting point of the mixture.

The following examples are included for a further understanding of the invention. In the examples, the end-use performance of the compositions is measured in the laboratory as the Elmendorf Tear Resistance (ASTM 0-689-44) and Secant Modulus of Elasticity or Stiffness (ASTM D-638).

EXAMPLE 1

A printable composition having good stiffness properties is prepared by fluxing in a Banbury mixer 786 grams (65.5%) crystalline polypropylene having a melt flow of 2.5 decigrams per minute and density of 0.902 and stabilized with 0.2% 4,4'-butylidene bis(6-tert-butyl-m-cresol) plus 0.3% dilaurylthiodipropionate, with 108 grams (9.0%) of Enjay's Vistalon 4608 (ethylene/propylene-5-ethylene-2-norbornene terpolymer), 90 grams (7.5%) titanium dioxide (DuPont's R100), and 216 grams (18%) talc (Georgia Talc's Talc 650). The product is then granulated and extruded into 6 mil film on a one inch M.P.M. Extruder. This film has a secant modulus of elasticity (stiffness) of 124,000 psi. and an Elmendorf tear strength of 40 grams per mil. This film can be written upon using a ball point pen or printed upon using a rubber hand stamp with a printer's ink such as IPI Speed King. The ink is rapidly absorbed so as to allow stacking of sheets without smearing.

EXAMPLE 2

A mixed polypropylene and polyallomer printable composition having properties similar to those in Example 1 is made by fluxing in a Banbury mixer 29.25 pounds each of a polypropylene (melt flow = 2.5 decigrams per minute and density = 0.902) and a polyallomer block copolymer of propylene and ethylene having a melt flow of 2.0 decigrams per minute and a density of 0.896, both stabilized as in Example 1 with 9.0 pounds polyethylene (melt index = 0.7 decigrams per minute and density = 0.96), 5.0 pounds ethylene/propylene rubber (Enjay's EPR-404), 9.0 pounds titanium dioxide pigment, 18.0 pounds talc and 0.5 pound N,N-bis(2-hydroxyethyl) cocoa amine (antistatic additive). The fluxed material is stripped and pelleted from a two-roll mill and extruded into 6 mil film on a 3½-inch Royle film-line extruder.

EXAMPLE 3

A printable polyallomer film composition having high tear resistance is prepared by blending 58.75 pounds of the polyallomer of Example 2 and stabilized as in Example 1 with 9.0 pounds of polyethylene (melt index = 0.7 decigrams per minute and density = 0.96), 5.0 pounds of Enjay's Vistalon 3509 EPT (ethylene/propylene-5-ethylene-2-norbornene terpolymer), 9.0 pounds titanium dioxide pigment, 18.0 pounds talc, and 0.25 pound glyceryl monostearate (an antistatic additive). The compounded material is fluxed in a Banbury mixer and pelleted as in Example 2. Six mil film is extruded through a 24-inch flat die on a 1¾-inch Prodex Extruder. This film has an Elmendorf tear strength of 330 grams per mil and a secant modulus of elasticity of 80,000 psi.

EXAMPLE 4

Books are cased in covers made with the film described in Example 3. These books weighing 2 pounds, 4 ounces each are then subjected to a tumble test consisting of dropping them 400 times from a height of 24 inches at 16 drops per minute. An animal glue such as Swift's ZF-492 is used to bond the printable polyallomer film to the bookback material. These books resist the normal failures found with many plastic covers such as splitting along the edges and loss of adhesive to plastic bond. The adhesive does not adversely affect the polyallomer film in that it does not become embrittled or discolor.

EXAMPLE 5

Samples of film prepared in Example 3 are subjected to ultraviolet light exposure in an Atlas Weather-Ometer. These samples resist discoloration and embrittlement for 450 hours as compared with only 120 hours to failure found for a material, disclosed in British Patent No. 1,090,059. The incorporation of an ultraviolet inhibitor, 2-hydroxy-4-dodecyloxybenzophenone, triples the time for failure of this polyallomer composition. At 150°C. in a dry air oven, samples of film described in Example 1 do not show visible evidence of oxidation for 150 hours as compared with less than 50 hours for the competitive sheet.

EXAMPLE 6

Six mil samples of film described in Example 2 are found to heat seal at 155° to 165°C. When tested in an Instron tester at jaw speeds of 2 to 20 inches per minute, the resulting seal does not separate before the specimen breaks.

Sheets or webs formed from the polymeric compositions of this invention can be used as supports for photographic emulsions, particularly emulsions which result in coatings which are free from cracking when the support is flexed.

Particularly good results are achieved when the silver halide emulsions are dispersed in polymers of the type disclosed in Smith French Patent No. 1,510,222; Ream et al. U.S. Pat. No. 3,287,289; or Dykstra U.S. Pat. No. 3,411,911.

Photographic silver halide emulsions, preparations, addenda, processing and systems which can be used with the sheets or webs of this invention are disclosed in *Product Licensing Index*, Vol. 92, December 1971, publication 9232, pages 107–110, paragraphs I–IX and XI–XXV.

EXAMPLE 7

The polyolefin compositions identified in Table I below are extruded through a flat and tubular die into photographic supports.

The film supports described in Table I below are coated with a silver chlorobromide (15 mole percent chloride) emulsion at 35 mg of silver/ft$^2$. To the emulsion is added the cyan coupler prepared similar to that described in Example 4 of U.S. Pat. No. 2,801,171, hereby incorporated by reference. The coated emulsions are then processed by a standard Kodak color development process for color print materials, Ektaprint C. The following physical and photographic results (using red light exposure) are obtained. the following examples describe the composition of said supports.

TABLE I

BLOCK COPOLYMERS

| Film No. | Poly-propylene % | Poly-ethylene % | % | Elastomer Type | TiO$_2$ % | Talc[8] % | % | Other Additives Type |
|---|---|---|---|---|---|---|---|---|
| A | 57.65 | 7.5 | 9.0 | Vistalon 4608[1] | 7.5 | 18.0 | 0.1 | Antioxidant[6] |
|   |       |     |     |                  |     |      | 0.25 | Antistatic Agent[7] |
| B | 57.65 | 7.5 | 9.0 | ERP-404[2] | 7.5 | 18.0 | 0.1 | Antioxidant[6] |
|   |       |     |     |            |     |      | 0.25 | Antistatic Agent[7] |
| C | 57.65 | 7.5 | 9.0 | Vistanex L-80[3] | 7.5 | 18.0 | 0.1 | Antioxidant[6] |
|   |       |     |     |                  |     |      | 0.25 | Antistatic Agent[7] |
| D | 57.65 | 7.5 | 9.0 | EPT-3509[4] | 7.5 | 18.0 | 0.1 | Antioxidant[6] |
|   |       |     |     |             |     |      | 0.25 | Antistatic Agent[7] |
| E | 57.65 | 7.5 | 9.0 | Royalene 502[5] | 7.5 | 18.0 | 0.1 | Antioxidant[6] |
|   |       |     |     |                 |     |      | 0.25 | Antistatic Agent[7] |

(1) a terpolymer of propylene, ethylene and 5-ethylene-2-norbornene
(2) ,ethylene/propylene rubber (Enjay)
(3) poly(isobutylene-ethylene) rubber
(4) ethylene/propylene rubber
(5) ethylene/propylene rubber (U.S. Royal)
(6) 4,4'-butadiene bis-2-tributyl-5-methyl phenol
(7) antistatic agent (glycerol mono- and di-stearate)
(8) Talc 650 - essentially magnesium silicate

| Coating No. | Film No. | Length & Cross Folds Emulsion Coated Support | Raw Support | Caliper mils Emulsion Coated Support | Raw Support | Basic Wt. lbs/1,000 ft$^2$ Emulsion Coated Support | Raw Support |
|---|---|---|---|---|---|---|---|
| 1 | A (flat) | 15,000+ | 15,000+ | 4.98 | 4.81 | 26.95 | 26.75 |
| 2 | A (tubular) | 15,000+ | 15,000+ | 5.72 | 5.47 | 31.77 | 30.34 |
| 3 | B (flat) | 15,000+ | 15,000+ | 5.20 | 5.25 | 28.42 | 27.53 |
| 4 | B (tubular) | 15,000+ | 15,000+ | 6.36 | 5.18 | 34.38 | 35.41 |
| 5 | C (flat) | 15,000+ | 15,000+ | 5.30 | 4.17 | 26.89 | 21.91 |
| 6 | C (tubular) | 15,000+ | 15,000+ | 5.70 | 5.88 | 30.58 | 31.30 |
| 7 | D (flat) | 15,000+ | 15,000+ | 4.78 | 4.60 | 25.36 | 24.07 |
| 8 | D (tubular) | 15,000+ | 15,000+ | 6.05 | 6.10 | 33.21 | 32.57 |
| 9 | E (flat) | 15,000+ | 15,000+ | 4.75 | 4.65 | 25.21 | 25.22 |
| 10 | E (tubular) | 15,000+ | 15,000+ | 6.03 | 6.09 | 32.25 | 33.71 |

| Coating No. | Modulus of Elasticity kg/1% Stretch 15 mm Strip Emulsion Coated Support | Raw Support | Elmendorf Tear Grams of Force to Tear Sheet Raw Support Length | Cross | Coated Support Length | Humidity Tests Size Change in Percent Raw Support 20%–70% Rel. Humidity | 70%–20% Rel. Humidity | Coated Support 20%–70% Rel. Humidity | 70%–20% Rel. Humidity | Weather-Ometer Test (No. of days required for embrittlement) Raw Support | Coated Support |
|---|---|---|---|---|---|---|---|---|---|---|---|
| 1 | 2.22 | 4.04 | 197 | 177 | 115 | .03% | >.01% | .27% | .06% | 8 | 12 |
| 2 | 3.24 | 2.92 | 155 | 119 | 130 | .03 | .01 | .14 | .06 | ok at 9 | 12 |
| 3 | 2.14 | 4.11 | 192 | 145 | 128 | .03 | >.01 | .23 | .19 | 9 | 9 |
| 4 | 3.66 | 2.96 | 153 | 114 | 133 | .02 | .01 | .20 | .13 | 9 | 12 |
| 5 | 2.53 | 5.21 | 79 | 100 | 72 | .02 | .02 | .18 | .09 | 7 | 12 |
| 6 | 3.90 | 4.07 | 70 | 96 | 64 | .03 | >.01 | .13 | .03 | 8 | 12 |
| 7 | 1.67 | 4.14 | 140 | 102 | 114 | .05 | .01 | .25 | .18 | 9 | 12 |
| 8 | 3.19 | 2.29 | 161 | 117 | 130 | .03 | .01 | .15 | .08 | ok at 9 | 12 |
| 9 | 1.76 | 3.84 | 113 | 107 | 86 | .06 | .01 | .19 | .16 | 9 | 12 |
| 10 | 3.15 | 2.63 | 138 | 117 | 134 | .01 | >.01 | .16 | .10 | 8 | 12 |

TABLE I-continued

| Coating No. | Fresh | | Incubation (1 Week) | |
|---|---|---|---|---|
| | $D_{min}$ | $D_{max}$ | $D_{min}$ | $D_{max}$ |
| 1 | .13 | 1.69 | .14 | 1.73 |
| 2 | .14 | 1.73 | .13 | 1.82 |
| 3 | .14 | 1.71 | .13 | 1.77 |
| 4 | .13 | 1.76 | .13 | 1.82 |
| 5 | .12 | 1.63 | .13 | 1.65 |
| 6 | .11 | 1.62 | .12 | 1.66 |
| 7 | .12 | 1.65 | .15 | 1.67 |
| 8 | .13 | 1.70 | .14 | 1.74 |
| 9 | .13 | 1.65 | .14 | 1.69 |
| 10 | .13 | 1.72 | .14 | 1.70 |

EXAMPLE 8

Multilayer photographic elements suitable for use in preparing three-color diffusion transfer images are prepared by coating the polymeric support sheets described in Example 7 with a plurality of layers as described in Example 1 of U.S. Pat. No. 3,330,655, hereby incorporated by reference, numbered in sequence from the support, as follows:

1. Red-sensitive layer

To one mole of a melted direct positive silver bromoiodide emulsion that has been redsensitized, is added 108 g. of cyan coupler XX in 2500 ml. of water and enough photographic gelatin to make a total of 139 g. per mole of silver halide. This solution is then coated so as to obtain 193 mg per square foot of gelatin, 150 mg per square foot of coupler, and 150 mg per square foot of silver.

2. Interlayer

To 4540 g of a 10% photographic gelatin solution is added 250 g of the antioxidant, 2-octadecyl-4-sulfohydroquinone potassium salt, in 5000 ml of hot water. This is coated to obtain 91 mg per square foot of gelatin and 50 mg per square foot of the antioxidant.

3. Green-sensitive layer

To one mole of a melted direct positive silver bromoiodide emulsion that had been green-sensitized, is added 81 g of magenta coupler XXXVII in 3000 ml of water and enough photographic gelatin to have a total of 162 g per mole of silver halide. This solution is coated so as to obtain 180 mg per square foot of gelatin, 90 mg per square foot of coupler, and 120 mg per square foot of silver.

4. Interlayer

To 4540 g of 10% photographic gelatin solution is added 250 g of the antioxidant used in layer 2 in 5000 ml of hot water and 4.0 g of yellow Carey Lea silver as a dispersion. This solution is then coated to obtain 91 mg per square foot of gelatin, 50 mg per square foot of antioxidant, and 8 mg per square foot of Carey Lea silver.

5. Blue-sensitive layer

To one mole of a melted direct positive silver bromoiodide emulsion that is inherently blue light-sensitive is added 144 g of coupler XLVI that has been dissolved in 750 ml of ethyl alcohol and 3000 ml. of water and enough photographic gelatin to have a total of 118 g per mole of silver halide. This solution is coated so as to obtain 161 mg per square foot of gelatin, 200 mg per square foot of coupler, and 150 mg per square foot of silver.

6. Topcoat layer

To 4540 g of a 10% photographic gelatin solution is added 250 g of ultraviolet absorbing compound, 5-(4-methoxy-3-sulfo)-benzylidene-2-phenylimino-3-octyl-thiazolidone sodium salt in 5000 ml of water. This solution is coated to obtain 91 mg per square foot of gelatin and 50 mg per square foot of the ultraviolet absorbing compound.

The silver bromoiodide emulsions utilized are of the type described in Davey et al., U.S. Pat. No. 2,592,250 wherein the silver halide grains have high internal sensitivity and low surface sensitivity. Test samples of the prepared photographic elements are then exposed for one-tenth second with a 500-watt positive lamp and a 4.08 Corning filter on an Eastman Type IB intensity scale sensitometer, thereafter immersed in a color developing composition for 30 seconds at 75°F. and then pressed in contact with a receiving sheet which is composed of the polymeric sheet described in Example 7 above having coated thereon a dimethyl-B-hydroxyethyl-2-(octadecylamido)-propyl ammonium dihydrogen phosphate mordant in gelatin. Removal of the receiving sheets shows excellent positive images on the receiving sheets.

| Color Developing Composition | | |
|---|---|---|
| 4-amino-N-ethyl-N-(β-hydroxyethyl)-aniline | g | 20.0 |
| sodium hydroxide | g | 15.0 |
| dihydroxylamine oxalate | g | 1.0 |
| benzotriazole | g | 0.16 |
| dimethyl sulfoxide | cc | 25.0 |
| p-[β-(methylsulfonamido)ethyl]phenyl hydrazine | g | 0.3 |
| water to make one liter | | |

EXAMPLES 9 – 15

The polyolefin compositions identified in Table 2 below are extruded into 6 mil film supports on a 3½ inch Royle filmline extruder. These film supports are then coated with a silver chlorobromide (15 mole percent chloride) emulsion at 35 mg of silver/sq. ft. To the emulsion is added the same cyan coupler as described above in Example 7. The coated emulsions are then subjected to the same color development process as described in Example 7. Table 2 describes the compositions of these supports, and illustrates results obtained using test methods similar to those employed in Table 1.

TABLE 2

| Example Number | Polypropylene, % | Polyethylene, % | Elastomer (1) | TiO₂, % | Talc, % | Other Additives |
|---|---|---|---|---|---|---|
| 9 | 60.65 | 7 | 9.0 | 5 | 18 | (2) |
| 10 | 57.65 | 12 | 9.0 | 6 | 15 | (2) |
| 11 | 54.15 | 12 | 11.0 | 7.5 | 15 | (2) |
| 12 | 50.15 | 11 | 11.0 | 7.5 | 20 | (2) |
| 13 | 43.65 | 14 | 12.0 | 15 | 15 | (2) |
| 14 | 44.35 | 13.30 | 12.0 | 10 | 20 | (2) |
| 15 | 48.5 | 7.15 | 13.0 | 6 | 25 | (2) |

(1) Terpolymer of propylene, ethylene and 5-ethylene-2-norbornene, sold under the tradename Vistalon 4608.
(2) Contains 0.1% of an antioxidant, as described in Example 7 and 0.25% of an antistatic agent containing glycerol mono- and di-stearate, sold under the tradename Tegin 515.

| Example No. | "Raw Support" Modulus of Elasticity (Kg/1% Stretch 15 mm Strip) | Elmendorf Tear Grams of Force to Tear Sheet | | Weather-Ometer Test (Raw Support) No. of Days Required For Embrittlement |
|---|---|---|---|---|
| | | length | cross | |
| 9 | 4.30 | 184 | 152 | 8 |
| 10 | 3.88 | 203 | 184 | 9 |
| 11 | 3.94 | 195 | 163 | 9 |
| 12 | 4.12 | 145 | 121 | 7 |
| 13 | 3.00 | 161 | 111 | 10 |
| 14 | 3.21 | 124 | 113 | 9 |
| 15 | 3.53 | 147 | 142 | 8 |

EXAMPLE 16

A propylene-ethylene polyallomer is prepared as described in Example 3 of Hagemeyer et al. U.S. Pat. No. 3,529,037, issued Sept. 15, 1970. A sample of the polyallomer containing no elastomer and containing 15% titanium dioxide is used to prepare a 5 mil sheet. The resulting sheet is found to have a secant Modulus of Elasticity of 62,000. Writing upon the sheet using a ball-point pen results in poor adhesion to the ink, and the ink is easily removed by rubbing. When a similar sample of polyallomer and a sample of crystalline polypropylene as described in Example 1 are each prepared having 15% titanium dioxide and 18% talc, the resulting 5 mil sheets are found to be stiff and brittle.

EXAMPLE 17

Samples described in Examples 9-15 prepared without antioxidants and tested in the Weather-Ometer become embrittled at 120 hours.

EXAMPLE 18

A sample of crystalline polypropylene as described in Example 1 and a sample of polyallomer as described in Example 3 of Hagemeyer et al. U.S. Pat. No. 3,529,027 are prepared with titanium dioxide having more than 15% by weight. The polymers are extruded with difficulty as the amount of titanium dioxide is increased and lack cohesion so that the resulting film is not continuous. Using less than 5% by weight results in loss of opacity and reflectance.

In similar samples with talc and without titanium dioxide, when the amount of talc is varied below about 15% by weight, the opacity is decreased whereas increasing the talc above about 40% by weight affects the extrudability of the polyolefin. Both talc and titanium dioxide are required to provide the desired printability, opacity, reflectance and extrudability of the polyolefin compositions.

The invention has been described in detail with particular reference to preferred embodiments thereof, but it will be understood that variations and modifications can be effected within the spirit and scope of the invention.

We claim:

1. A diffusion transfer receiving sheet comprising a support having thereon a dye image-receiving layer, said support having the stiffness, opacity and printability normally associated with paper and being formed from a composition consisting essentially of
   A. a film-forming crystalline polymer containing at least 80 percent by weight of polymerized propylene selected from the class consisting of:
      1. a block copolymer of propylene with a least one other α-monoolefin selected from the group of
         a. ethylene, and
         α-monoolefin hydrocarbons of 4 to 10 carbon atoms;
      2. mixtures of crystalline polypropylene and said block copolymer; and
      3. polypropylene;
   B. about 15 to about 40% by weight talc;
   C. about 5 to about 15% by weight titanium dioxide pigment;
   D. about 5 to about 20% by weight of a polyolefin elastomer; and
   E. about one-tenth to about 1% by weight of a polyolefin antioxidant.

2. A color photographic diffusion transfer process for forming a pattern of developable silver halide in a photographic element comprising a support having the stiffness, opacity and printability normally associated with paper, formed from the composition consisting essentially of:
   A. a film-forming crystalline polymer containing at least 80 percent by weight of polymerized propylene selected from the class consisting of:
      1. a block copolymer of propylene with at least one other α-monoolefin selected from the group of
         a. ethylene, and
         b. α-monoolefin hydrocarbons of 4 to 10 carbon atoms;
      2. mixtures of crystalline polypropylene and said block copolymer; and
      3. polypropylene;
   B. about 15 to about 40% by weight talc;
   C. about 5 to about 15% by weight titanium dioxide pigment;
   D. about 5 to about 20% by weight of a polyolefin elastomer; and E. about one-tenth to about 1% by weight of a polyolefin antioxidant, and having superposed red, green and blue light-sensitive direct-positive hydrophilic colloid silver halide emulsion layers wherein said silver halide forms latent image predominantly inside the silver halide grains and having disposed integrally with said element and contiguous to said emulsions a cyan-forming coupler, a magenta-forming coupler and a yellow-forming coupler, said couplers being non-diffusible during development in the presence of an alkaline color-developing agent and capable of forming diffusible acid dyes substantially complementary to the color of the spectral sensitivity of the respective contiguous light-sensitive layers in said alkaline color-developing composition by reaction with color development oxidation product of said color-developing agent, said process comprising the steps of (1) exposing said photographic element to light; (2) development in the presence of said alkaline color-developing composition containing an aromatic primary amino color-developing agent; and (3) transfer of the diffusible acid dyes to a receiving sheet.

* * * * *